(12) United States Patent
Al Ahmad

(10) Patent No.: US 10,134,384 B2
(45) Date of Patent: Nov. 20, 2018

(54) SYSTEM AND METHOD FOR SYNTHESIZING HUMAN SPEECH

(71) Applicant: United Arab Emirates University, Al Ain (AE)

(72) Inventor: Mahmoud F. Y. Al Ahmad, Al Ain (AE)

(73) Assignee: United Arab Emirates University, Al Ain (AE)

(*) Notice: Subject to any disclaimer, the term of this patent is extended or adjusted under 35 U.S.C. 154(b) by 0 days.

(21) Appl. No.: 15/337,079

(22) Filed: Oct. 28, 2016

(65) Prior Publication Data

US 2017/0125009 A1    May 4, 2017

Related U.S. Application Data

(60) Provisional application No. 62/247,521, filed on Oct. 28, 2015.

(51) Int. Cl.
*G10L 13/04* (2013.01)
*H04R 17/02* (2006.01)
(Continued)

(52) U.S. Cl.
CPC ............ *G10L 13/043* (2013.01); *G10L 15/24* (2013.01); *H04R 1/46* (2013.01); *H04R 17/02* (2013.01)

(58) Field of Classification Search
USPC ................ 704/258, 260, 270–272
See application file for complete search history.

(56) References Cited

U.S. PATENT DOCUMENTS 5,888,187 A    3/1999  Jaeger et al.
6,978,169 B1 * 12/2005  Guerra ............... A61B 5/0006
                                            600/523
(Continued)

FOREIGN PATENT DOCUMENTS

DE    102009023924 B4    1/2014
EP         0519621 A1    12/1992

OTHER PUBLICATIONS

Miyaoka et al.,"Applicability of piezoelectric sensors for speech rehabilitation," Journal of Medical Engineering & Technology, vol. 33, No. 4, May 2009, 328-333.
(Continued)

*Primary Examiner* — Leonard Saint Cyr
(74) *Attorney, Agent, or Firm* — Fitch, Even, Tabin & Flannery LLP

(57) ABSTRACT

A method and apparatus are described for detecting voice related vibration in the upper region of the chest and synthesizing human speech. The innovation finds its use in speech rehabilitation applications among others, specifically in speech impairments and speech disability arising due to accident, congenital defects or other reasons. A set of piezoelectric based sensors are placed on an upper region of the chest atop or near sound tendons. The sensors pick up the vibrations in the sound tendons and convert the vibrations into electrical output signals. These signals are filtered, amplified and processed using the signal recognition unit. Subsequently, a set of parameters are extracted and used to generate speech or a written text. The sensors incorporate piezoelectric or other transducing materials. These sensors are externally affixed to a human body surface corresponding to the position of the sounds tendons in the upper chest/neck region.

20 Claims, 3 Drawing Sheets

(51) Int. Cl.
*H04R 1/46* (2006.01)
*G10L 15/24* (2013.01)

(56) References Cited

U.S. PATENT DOCUMENTS

| | | | |
|---|---|---|---|
| 7,089,177 B2 | 8/2006 | Burnett et al. | |
| 7,914,468 B2* | 3/2011 | Shalon | A61B 5/0006 |
| | | | 600/587 |
| 2002/0099412 A1* | 7/2002 | Fischell | A61N 1/36025 |
| | | | 607/3 |
| 2004/0234933 A1* | 11/2004 | Dawson | G09B 23/28 |
| | | | 434/262 |
| 2006/0064037 A1* | 3/2006 | Shalon | A61B 5/0006 |
| | | | 600/586 |
| 2011/0319021 A1 | 12/2011 | Proulx et al. | |

OTHER PUBLICATIONS

U.S. Appl. No. 15/095,956, "Apparatus and Method for Physiological Mechanical and Electrical Activity Monitoring", filed Apr. 11, 2016, 27 pages.

* cited by examiner

SYSTEM AND METHOD FOR SYNTHESIZING HUMAN SPEECH

CROSS REFERENCE TO RELATED APPLICATION

This application claims priority as a non-provisional application to Provisional Application No. 62/247,521, filed on Oct. 28, 2015, entitled "System and Method for Synthesizing Human Speech" the entire disclosure of which is hereby incorporated by reference.

TECHNICAL FIELD

This invention relates generally to synthesizing human speech and more particularly to speech synthesis using piezoelectric material, or other material with transducing properties, and signal processing techniques.

BACKGROUND

Almost 20% of the world population suffers from speech disorder, impairments and disabilities. In certain circumstances and due to illness, the larynx could be completely or partially removed. The larynx involves among other functions the production of sound in humans as it houses the vocal folds that are responsible for phonation. Injury or removal of the larynx will cause disorders or even loss of voice forever. Voice loss is likely to result in cases of laryngectomy or partial laryngectomy in which the larynx is entirely or completely removed, respectively. In such circumstances, one may no longer be able to force air from one's lungs through one's mouth to speak.

Some solutions that have been presented to address this problem include the use of an apparatus comprising a computer through which speech is synthesized. The user is able interact with the apparatus, either through writing and/or the use of the user's other senses to signal the apparatus for selecting characters on a list of ones displayed to the user by an automatic scrolling device on the user's computer screen. Such speech synthesizers include text prediction software as well as electronic voice synthesizers.

Other solutions have been presented in the field to tackle the issue of speech synthesis. For example, European Patent Application No. 92305078 discloses an external piezoelectric transducer which is able to detect voice sound vibration from the human head particularly the cheek and convert it into an electrical signal. This signal is then converted into speech (voice sounds). U.S. patent application Ser. No. 11/198,287 discloses a low power EM sensor capable of detecting tissue motion in the neck region, either from the sub-glottal (the section of the neck, where the neck meets the chest) and the supraglottal region (the section of the neck, where the neck meets the jaw). The signals detected through the EM sensor are synthesized into speech using a control algorithm. U.S. Pat. No. 5,888,187 describes the use of an implantable microphone, which may be piezoelectric crystal microphone, capable of generating electrical signals based on vibrations. The vibrations are picked up using a diaphragm. The electrical signal is further processed, filtered and converted into speech. German Patent Application No. 102009023924 discloses a system for sensing whisper/pseudo-whisper in the oral cavity of the human and converting it into an electrical signal. The signal is then processed, filtered and converted into speech (voice sounds) and/or written text. The system may be implantable or used as a releasable fixable prosthesis. U.S. patent application Ser. No. 13/118,285 discloses an intra-oral appliance for detecting tissue conducted vibrations generated by audible sounds from the oral cavity. The microphone employed in the appliance comprises a piezoelectric film present in vibration communication with the contact surface. The appliance is capable of wirelessly transmitting the signal containing user-generated sounds to a phone or radio. The publication Miyaoka et al. entitled "Applicability of piezoelectric sensors for speech rehabilitation", published in the Journal of Medical Engineering & Technology, Vol. 33, No. 4, May 2009, pp. 328-333, discloses an external piezoelectric sensor capable of picking up signals during vocalizing tasks from the front of the neck for speech rehabilitation. All of the references described above are incorporated here by reference.

Examples of commercially available devices to assist individual's suffering from speech problems include communication display boards, electrolarynx, speech generating devices and voice amplifiers. Communication display boards consist of two types fixed (low-tech) and dynamic (high-tech) display boards. In a fixed board the symbols pictures, words and phrases are fixed whereas a dynamic display board has a touchscreen that is available to allow interaction by the user. The device is hand-held and the output voice of the dynamic board is a digitized sound from the speaker device. The digitized voice is generated from the device through non-vocal input by the user.

The Electrolarynx is another example of a hand-held device that helps people who lost their larynx/voice box. It is used to produce clearer speech to communicate and to increase/replace speech for people with sharp speech problems. With the improvement of digital and wireless technologies, additional devices are being offered in order to help such people to communicate more meaningfully and enjoy more in their daily lives. The Electrolarynx allows patients to speak long sentence that may be understood by others. Such devices need to be placed on the neck and turned on every time it is used. So, the use of the device requires the user to constantly hold it and press it against her or her nick. Furthermore, the speech tone generated by the electrolarynx sounds mechanical, which may be considered unnatural.

Speech-generating devices (SGD) are also known as voice output communication aids. SGD are electronic devices or software that allow a user who has speech damage the ability to select messages to be vocalized loud. The first type of these devices was a sip- and puff typewriter controller that was developed in the 1960s. Usually, when using the SGD, the output is slower than the actual speech.

A voice amplifier is a small portable device, which uses a speaker to offer clear and loud speech that is useful for people who have speech difficulties such as: vocal nodules, damaged or partially paralyzed vocal cords, impairment of throat or chest muscles or diminished lung capacity. The amplifier has a line input jack that may be connected to the output of a Speech Generating Device (SGD) to increase the loudness level of the user's voice in noisy surroundings and a high capacity rechargeable battery. Voice amplification offers many advantages for the user: it avoids damage or more damage for the throat, decreases misunderstandings & need for repetition, it offers easier, accurate communication and it is simple to use. Examples of voice amplifier devices are ADDvox™, BoomVox™, ChatterVox™, Oticon™, SoniVox™, Spokeman™, and Voicette™.

There is a desire in the field for the development of techniques to improve accuracy and/or quality of the synthesized speech in a cost efficient and durable fashion using easily accessible probing systems.

SUMMARY OF THE INVENTION

The invention describes a method and apparatus for detecting voice related vibration in the upper region of the chest and synthesizing human speech. The innovation finds its use in speech rehabilitation applications, specifically in speech impairments and speech disability arising due to accident, congenital defects or any other reasons. Broadly speaking, a set of piezoelectric based sensors are placed on the upper region of the chest atop or near sound tendons. When the user speaks, the sensors pick up the vibrations in the sound tendons and convert the vibrations into electrical output signals. These signals are filtered, amplified and processed using the signal recognition unit. Subsequently, a set of parameters are extracted and used to generate speech or a written text. The sensors incorporate the smart piezoelectric materials, preferably in the form of sheets. These sensors are affixed on an external surface of the human user body corresponding to the position of the sound tendons in the upper chest/neck region.

The invention has several aspects. One aspect provides for a method for synthesizing speech using piezoelectric material in contact with a chest of a subject, the method includes obtaining a piezoelectric electrical signal from the piezoelectric material. The piezoelectric electrical signal is based on mechanical movement of the chest and the mechanical movement is related to movement of sound tendons of the subject during an act of speaking. The method also includes the steps of communicating the piezoelectric electrical signal to a signal processor, manipulating the piezoelectric electrical signal in the signal processor using signal processing techniques, extracting from the manipulated piezoelectric electrical signal a set of speech identifying parameters; and generating a speech signal using the set of speech identifying parameters. The speech signal generated corresponds to the piezoelectric electrical signal.

In one embodiment, the method described above further includes the step do conveying the generated speech signal using a speaker. The speaker may be in proximity to the user or it may be at another location different from the user's.

In some embodiments, the steps of manipulating the piezoelectric electrical signal in the speech synthesis method described includes segmenting the piezoelectric signal into a plurality of frames and identifying from at least one of the plurality of frames at least one parameter of the set of speech identifying parameters.

In another embodiment of the invention, the method further includes powering the signal processor using electricity generated from movement of the chest due to mechanical movement related to movement of the sound tendons and other physiological activities such as heart or lung movement.

In some embodiments, the method further includes the steps of obtaining an audio electrical signal corresponding to the movement of the sound tendons of the subject during the act of speaking, mapping the audio electrical signal to the piezoelectric signal; and storing the mapped piezoelectric signal in a library for comparison with the set of speech identifying parameter. In this embodiment, the library generated may be used as a reference by the user for later uses. More specifically, when a user uses the speech synthesis method described to generate piezoelectric signals corresponding to the action of speaking, the signal is compared to entries in the library and when a positive correlation is established with one of these entries, the such entry is added to the speech signal to be generated by the method.

In the last embodiment described, the mapping of the piezoelectric electric signal to the audio electrical signal may be performed using a linear one-to-one mapping technique. In other embodiments, other mapping techniques may be used.

In some embodiments, the speech synthesis method may further include the step of storing the library on a memory storage device, wherein the memory storage device is accessible by the processor. The memory storage device may be internal or external to the processor. The memory storage may also be in the form of a virtual storage such as a Cloud or other types of virtual storage banks available in the art.

In some embodiments, the speech synthesis method may also include the step of filtering and amplifying the piezoelectric signal before processing. This may be done to strengthen the signal for processing.

In some embodiments, the step of manipulating the piezoelectric signal using signal processing techniques in the speech synthesis method may include the steps of wirelessly transmitting the piezoelectric signal using a transmitter and receiving the transmitted piezoelectric signal using a receiver located at a location away from the transmitter such that the step of extracting from the manipulated piezoelectric signal the set of speech identifying parameter is performed at the location of the receiver.

In the last embodiment described, the speech synthesis method may also include the step of comparing the piezoelectric signal to a pre-determined threshold before transmitting it by the transmitter and amplifying the piezoelectric signal before transmitting it if the piezoelectric signal is determined to be below the pre-determined threshold. Additionally, one the transmitted signal is received by the receiver, the received signal may be compared to a second pre-determined threshold. If the signal is determined to be below that threshold, the signal may be conditioned to be amplified before being passed to the processor for processing.

In another aspect of the invention, a system for synthesizing human speech is described. The system includes piezoelectric based sensors for placement in contact with a chest of a subject. The piezoelectric based sensors sense mechanical movement of the chest and the mechanical movement are related to movement of sound tendons of the subject during an act of speaking. The piezoelectric based sensors generate a piezoelectric signal corresponding to the mechanical movement of the chest. The system also includes a processor for receiving the piezoelectric signal generated from the piezoelectric based sensors. The processor is configured to manipulate the received piezoelectric signal generated, extract a set of speech identifying parameters and generate a speech signal using the set of speech identifying parameter. The speech signal generated corresponds to the piezoelectric signal.

In one embodiment of the previous aspect of the invention, the system may also include a power storage unit for storing transduced electricity from piezoelectric material. The transduced electricity is transduced from mechanical movement on the chest of the subject due to movement of the sound tendons and other physiological activity such as heart or lung movement. The power storage unit may be used to power the processor and the other components of the system.

In any of the embodiments describing the speech synthesis system, the system may include at least one speaker for conveying the speech signal. In some embodiments, more than one speaker is used to convey the speech signal. The speakers may be in the same location or different locations. In some embodiments, the signal may be convey through the speakers simultaneously or with a delay among them.

In any of the embodiments describing the speech synthesis system, the system may include at least one transmitter for wirelessly transmitting the piezoelectric signal to at least one receiver located at a location away from the at least one transmitter and wherein the processor is located at the same location as the at least one receiver. In other embodiments, the transmitter and receiver may be at different locations.

In embodiments that include transmitters and receivers of the piezoelectric signal, the system may also include one or more conditioning circuits for filtering and amplifying the signal if needed both before transmitting and after reception but before processing.

In a third aspect of the invention, a processor for synthesizing human speech is described. The processor is configured to receive piezoelectric signals generated based on mechanical movement of a chest portion of a subject. The mechanical movement is related to movement of sound tendons of the subject during an act of speaking. The processor is also configured to manipulate the received piezoelectric signal, extract from the manipulated piezoelectric signal a set of speech identifying parameter; and generate a speech signal using the set of speech identifying parameter. The speech signal generated corresponds to the piezoelectric signal.

BRIEF DESCRIPTION OF THE DRAWINGS

The accompanying drawings illustrate non-limiting example embodiments of the invention.

DETAILED DESCRIPTION

Figure 1:
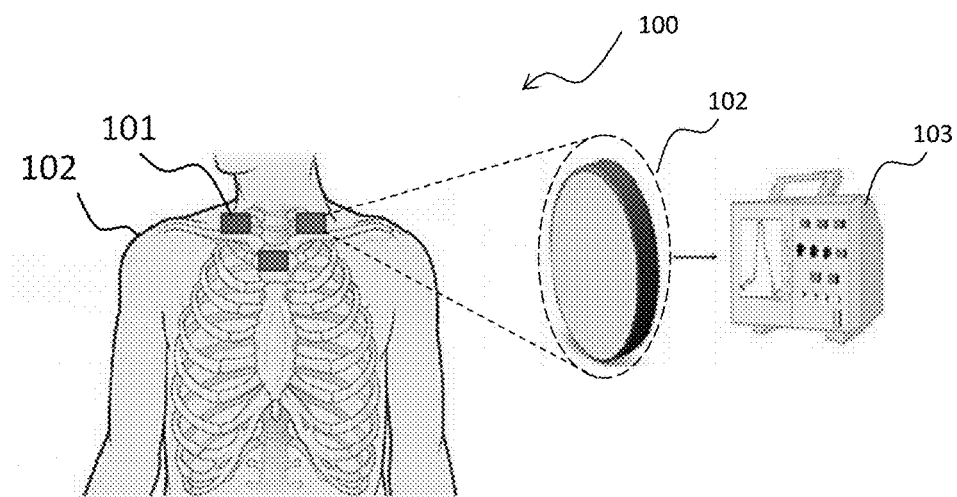
FIG. 1 shows illustrates locations on the human chest when piezoelectric sensors are located when using a speech synthesis system according to an example embodiment of the invention.

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

This invention presents a method and apparatus which use signal processing techniques along with the piezoelectric theory and/or the development of speech reconstruction algorithms to improve accuracy and/or quality of the synthesized speech.

Piezoelectric based transducers technology could convert one form of energy into another. They have a range of uses, particularly as sensors. The piezoelectric effect has been used in thousands of sensing applications. These applications range from infrared sensors, stress gauges, and vibration detectors. The piezoelectric materials have been used for hearing aid and in speakers. The use of piezoelectric components can be quite advantageous, since the piezoelectric components would need fewer parts to fulfill the desired functionality. Therefore, the application of piezoelectric components in speakers for hearing aids can bring both technical (durability, consumption, etc.) and economic advantages. The microphone incorporates piezoelectricity to turn the sound energy in the voice into electrical signals that could be interpreted.

Mechanical movement on the surface of a body of a human is caused, at least in part, by mechanical movement of the human's internal organs such as heart muscles, lungs and other organs. Such mechanical movement is also caused by internal vibrations for example due to movement of the vocal cords. The current disclosure may refer hereinafter to the activity of internal organs in a human, a person or a subject; however, it is to be understood that the teachings in this disclosure covers activity of any moving organ in any living organism.

When piezoelectric material is attached to the person's body, the mechanical movement of the body models a mechanical load and produces a relative induced strain on the piezoelectric material, which in turn causes the piezoelectric material to generate a corresponding conformal voltage signal. This voltage signal may be mapped with the movement actions of a certain organ or a combination of organs and the resultant voltage signal may be used to extract and model the corresponding parameters for the organ or organs using piezoelectric and signal processing theories. Explicit expressions may be derived that relate the voltage output signal describing the parameters based on the electromechanical coupling analogy. Different mapping techniques known in the art may be used. By way of non-limiting example, a linear one-to-one mapping may be used.

FIG. 1 shows a schematic representation of a speech synthesis system 100 in an embodiment of the invention. System 100 shows piezoelectric sensors 101 placed at the upper side of the chest surface of a person 102. The sensors 101 are placed on the chest area atop of or near sound tendons (or sinew) which are capable of withstanding tension. During speaking, these tendons vibrate and when pronouncing specific letters of the alphabet or a combination thereof, these tendons will resonate at specific frequency with a specific amplitude depending on many parameters such as age, gender or other physiological and physical known parameters of a subject.

The piezoelectric sensors 101 used in this embodiment are sheet sensors (a DuraAct™ patch transducer); however other piezoelectric material and transducers that may respond to vibrations by generating AC signal known in the art may be used. Different configuration of the piezoelectric material known in the art may be used. As a non-limiting example, the piezoelectric sensors 101 used may consist of a single sheet to capture various temporal signals, or it may be formed as an array of small piezoelectric sensors to capture the temporal and spatial movement of the chest to give an added spatial granularity on top of the localized temporal signal. In the example embodiment provided in FIG. 1, three piezoelectric sensors 101 are used.

In FIG. 1, the output terminals of piezoelectric sensors 101 may be connected to a digital oscilloscope 103. In some embodiments (not shown), the output terminals of the piezoelectric material may also be connected to a smart display through a microcontroller that can read the output voltage of the piezoelectric sensor.

In system 100, when an individual speaks, the internal movement of the sound tendons causes mechanical movement on the chest surface of user 102. Due to the proximity of the piezoelectric sensors 101 to the source of the movement, sensors 101 are subjected to a mechanical load produced, at least, by the sound tendons' movement. The strain induced in piezoelectric sensors 101 generates a voltage or a corresponding electrical signal. This energy conversion from the mechanical to the electrical is theoretically accounted for by a transformer with a turns ratio (not shown).

The voltage signal generated by piezoelectric sensor 101 represents an instantaneous voltage output signal that may be displayed and recorded on oscilloscope 103. The voltage signal is a product of a multi-input, single output system, where the inputs may include, among others, speech parameters as well as parameters related to other physiological activity such as heart and lung movement. In some embodiments (not shown), the signal may also be a product of a multi-input, multi-output system. In order to extract the representation of speech parameters of interest from the voltage signal, piezoelectric theory and signal processing techniques are used.

Figure 2:
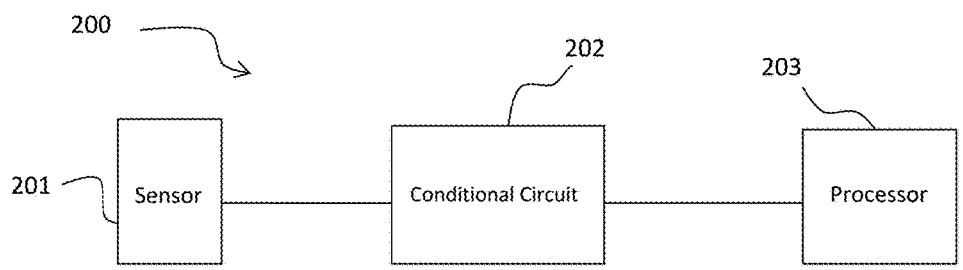
FIG. 2 shows schematic representation of a speech synthesis system according to an example embodiment of the invention.

FIG. 2 shows a system 200 comprising a piezoelectric sensor 201, a conditional circuit 202 and a processor 203. In some embodiments, conditional circuit 202 and processor 203 may be provided in the same device. In other embodiments such as the one shown in FIG. 2, the two components may be provided separately.

When a user of the system speaks, a voltage signal is generated based, at least, on the movement of the top part of the chest due, at least, to the internal vibrations of the sound tendons. The measured open circuit voltage output signal is passed through a unity gain buffer (not shown). The buffer is used to isolate sensor 201 from conditional circuit 202 and to maintain the piezoelectric sensor output current at a level high enough to drive the amplifier circuit so that the input signal to the circuit does not decay. The conditional circuit provided in this embodiment is one example of possible conditional circuits. It is to be understood that any conditional circuit known in the art that is able to provide amplification and DC offset to a signal may be used.

Sensor 201 is made out of high sensitive piezoelectric materials which can generate a low output voltage signal that can be amplified by conditional circuit 202. The conditioned signal is then passed to processor 203, which may be an Arduino™ processor or any other suitable type of processor. Processor 203 is then used to process the conditioned signal to identify and recognize the corresponding speech parameters in the conditioned signal and generate, based on the identified parameters, the voice (speech signal), corresponding to the mechanical movement of the sound tendons, through the use of a speech synthesizer unit, which then can be displayed and broadcasted or emitted using a speaker. In some embodiments, processor 203 may comprise a recorder for recording the measured piezoelectric signal and other signals.

Any speech synthesizer known in the art may be used to process the electrical audio signal to synthesize the speech. Although not necessary, it is preferable to use speech synthesizers that allow for mimicking human voice and tone. It is also preferable that such synthesizers allow for the manipulation of the voice to match or be substantially similar to the original voice of the human subject using the speech synthesis system described. Similarly, any speaker or loudspeaker known in the art may be used to convey the synthesized speech.

System 200 incorporates in processor 203 a library of relevant parameters (not shown). The library may be stored on the internal memory storage of the processor (not shown) as a built-in library or it may be stored on an external memory storage (not shown) from which it may be accessed by processor 203. The memory storage may be a flash memory or other suitable memory storage devices known in the art. The library may be further amended or replaced to allow for customization of the system and training and/or adjusting the system at a later date. It is to be understood that any training procedure known in the art may be used.

In some embodiments, the library of identifying parameters may be amended by the user manually. In other embodiments, the library of identifying parameters may be amended by a service provider through rolling updates that may be introduced manually or automatically to processor 203. The parameters may be generated from a corresponding electrical signal (audio signal) under known conditions.

Figure 3:
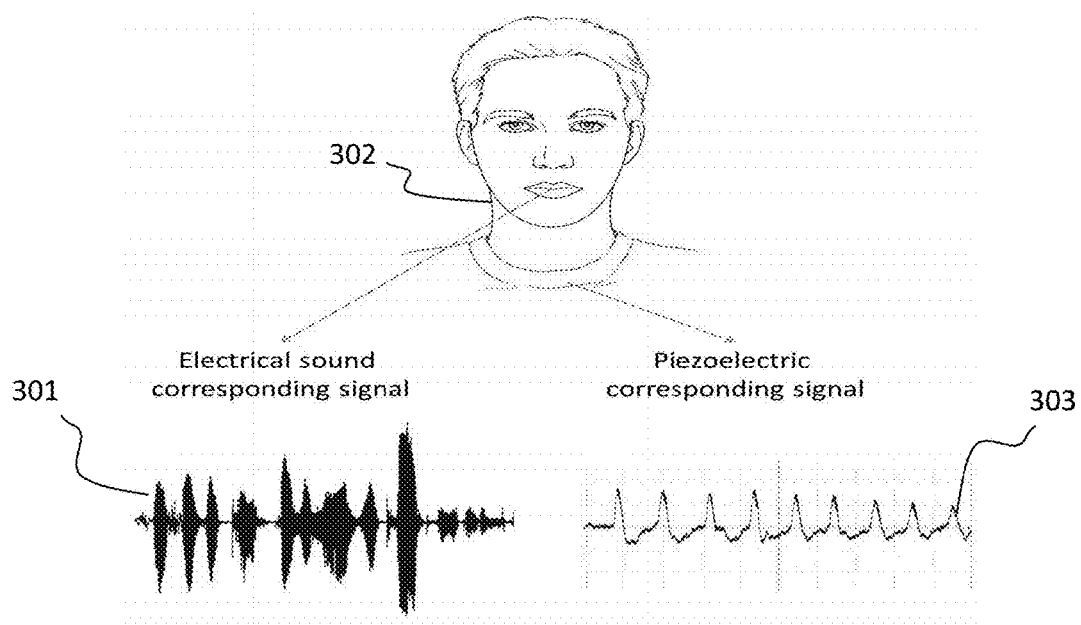
FIG. 3. Shows a schematic representation of one possible setup used to generate the library of parameter identifies for human speech in the speech synthesis system of the invention.

The process of generating the library may involve a controlled setup in which a user is asked to speak certain letters, words and phrases. FIG. 3 shows one possible setup used to generate the library of parameter identifies for human speech. An electrical audio signal 301 is recorded during the time the user 302 speaks the control sound. Simultaneously, electrical signals 303 are recorded from the piezoelectric sensors placed on the chest of user 302, as described in system 100 in FIG. 1. The piezoelectric electrical signal 303 is then conformally mapped with audio electrical signal 301 of the sound made by the processor. Different mapping techniques known in the art may be used. By way of non-limiting example, a one-to-one mapping may be used to achieve the identifying parameter. The conformed signal is then stored in the library as an identifying parameter for the specific letter, word or phrase for which the signal corresponds. The library is populated with speech identifying parameters through repeated use of the control setup for different control sounds.

It is preferable that the control setup for generating the library of identifying parameters is performed on the same user who intends to use the device at a later date. By doing so, the human element observed in the control conditions used to generate the library would have a great similarity to that of the user during normal use of the system. This will allow the minimization of the margin of error that may result from the human component in operating the system as long as the subject's physiological and physical characteristics are substantially unchanged. Such measurement may require updating if the subject experiences substantial physiological or physical changes, such as growth, aging, loss of weight or other physiological or physical changes known in the art that may affect speech in the subject.

In some embodiments, the library may contain lookup tables containing measured controlled parameters for the same user under varying conditions. When the speech synthesis system is later in use by the user, the system may assess the condition of the user and select from the library the parameters corresponding to the conditions that are closest to those of the user.

It is also within the scope of this invention that the user operating the control system to generate the library of identifying parameters may be different from the one who will ultimately use the speech synthesis system disclosed. Such circumstance may occur when the ultimate user is handicapped or suffers a form of speech debilitating paralysis. In such circumstances, a normal user may be used to generate the library of speech identifying parameters. The parameters may then be corrected by certain coefficient to compensate/match for the voice synthesis process for the handicapped. It may be possible to minimize the margin of error by choosing the normal user to have similar physical and physiological characteristics that may affect speech, to the injured, handicapped or paralyzed user.

The control setup may comprise the user speaking the control letter, word or phrase only once and during that time, the piezoelectric and electrical audio signals are measured simultaneously. However, in some embodiments, a user may be asked to speak the control sound repeatedly over a period of time under the same conditions such as loudness, speed and other parameters known in the art that would affect the output when a letter, word or phrase is spoken. This is done to establish a periodic tone containing the control letter, word or phrase. Due to the repetition of the sound, audio and piezoelectric signals will have periodically repeating segments. It is understood that the segments will be substantially similar to one another but would have a slight variation, which may be attributed to margins of error in the mechanical components of the system or due to human error on the part of the user in replicating the sound. For statistical accuracy, the repeating segments may then be averaged for the piezoelectric signal and the electrical audio signal independently and the averaged signals may then be conformally mapped.

It is to be understood that the method of conformally mapping the piezoelectric signal with the electrical audio signal and the generation of the library of speech identifying parameters described is only an example method. Other methods known in the art such as the linear predictive techniques known in the art may be used in place of or in addition to the techniques described above to extract certain set of parameters from the corresponding electrical pulses that may be used later to generate and reconstruct the speech signal again.

The controlled setup described for generating the library of speech identifying parameters may also include control aspects to deal with noise, as well as movement caused by other physiological activity in the user's body such as heart or lungs' movement. For example, it is known that a person exhales during the act of speaking, therefore, the audio electrical signal recorded during the speaking controlled exercise will inherently incorporate the mechanical movement of the chest as the person exhales during speech. Another possible condition that may be incorporated is the speed of the movement of the chest due to exhalation which may be contributed to an abnormal state of the user when recording the controlled audio signal, such as excitation or exhaustion after playing sports for example. Such state may also be recorded as a classification of the signal identifier in the library. The control setup may also subject the control user to conditions to minimize voluntary movements that may ultimately affect the piezoelectric measurement during the action of speaking.

Returning to FIG. 2, in system 200, the conditioned signal is analyzed by processor 203 over many short segments, called frames. In some embodiments, the duration of each frame may have a range of several mille-seconds. In other embodiments, the duration range of each frame may be customized to have a different range to fit the user's needs. In each frame, processor 203 identifies any parameters present in the frame and compares the identified parameter to the library of parameters stored on the storage unit of processor 203. Once a parameter is positively identified by processor 203 to match a corresponding one in the library of parameters, the processor tags such parameter. If no identified parameters are identified in a frame, the frame may be combined with a preceding or a following frame and the combined signal from such frames may be compared against the lookup library of identifying parameters stored in the library.

The processor then combines in sequence the "taged" results obtained through processing the frames. An electrical signal is then produced by processor 203 to correspond to the mechanical movement of the chest detected by piezoelectric sensors 201 during the user's speech. Audio signals have frequencies in the audio frequency range of roughly 20 to 20 kHz. Such signals may be synthesized directly using microphones. Loudspeakers or headphones may then be used to convert the generated electrical audio signal into sound, which is conveyed or emitted as speech of the user. So, through the use of the library of identifiers, speech synthesizers and speakers, the synthesized speech is then conveyed.

Figure 4:
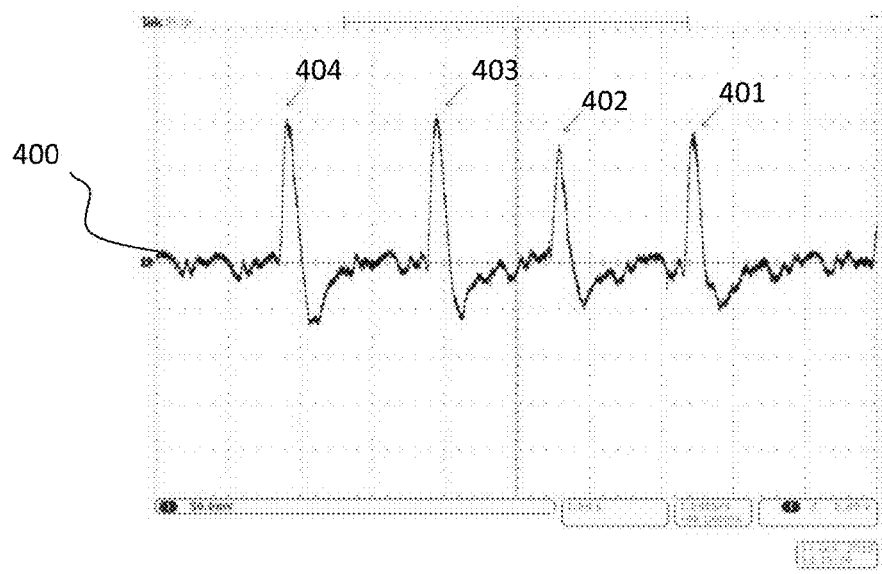
FIG. 4 shows a diagram which shows the piezoelectric signal produced by the system when the user speaks the control letters A, B, C and D sequentially.

In some embodiments, the speech synthesizer and/or the speaker may be integrated in the same system. In other embodiments, such components may be separate from the speech synthesis system. FIG. 4 shows a sample piezoelectric signal 400 generated using system 200. Signal 400 comprises four identified sections 401, 402, 403 and 404 based on the lookup library of speech identifying parameters. These sections correspond to the user pronouncing four alphabets in sequence, namely A, B, C and D, respectively.

The method of correlating the audio and piezoelectric corresponding signals with each other will be now described in detail. As previously stated, referring to FIGS. 1-3, induced stress in piezoelectric sensor 101 on the mechanical side is related to the output voltage produced in the sensors on the electrical side through the transformer. This induced stress is correlated with the sound tendons' mechanical action due to the voice generation which is conformally mapped with the corresponding output voltage signal. The equivalent turns ratio for the transformer is given by:

$$n = -d_{31} c_p / t_c \qquad (1)$$

where $c_p$ is the elastic constant for the piezoelectric material, $t_c$ is the piezoelectric beam thickness and dm is the piezoelectric voltage constant.

The relation between the stress acting on the piezoelectric transducers, represented by p(t), and output voltage signal, V(t), is given by:

$$p(t) = n * V(t) \qquad (2)$$

where n is the piezoelectric turns ratio representing the mechanical to electrical conversion process in the transducer.

Figure 5:
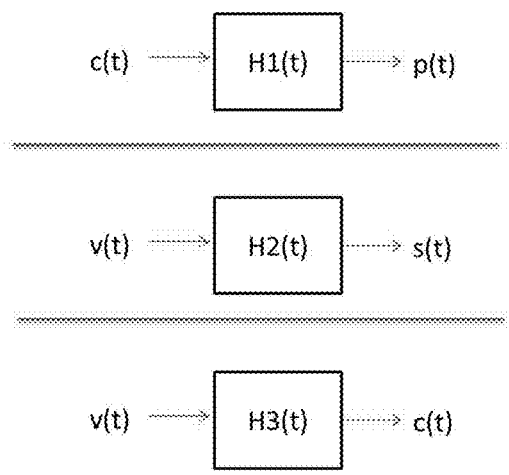
FIG. 5 a schematic diagram showing the relationship in the time domain between the chest pressure acting mechanical movement c(t), output piezoelectric electrical signal p(t), the sound audio electrical signal s(t) and the voice signal (natural one) v(t).
Figure 6:
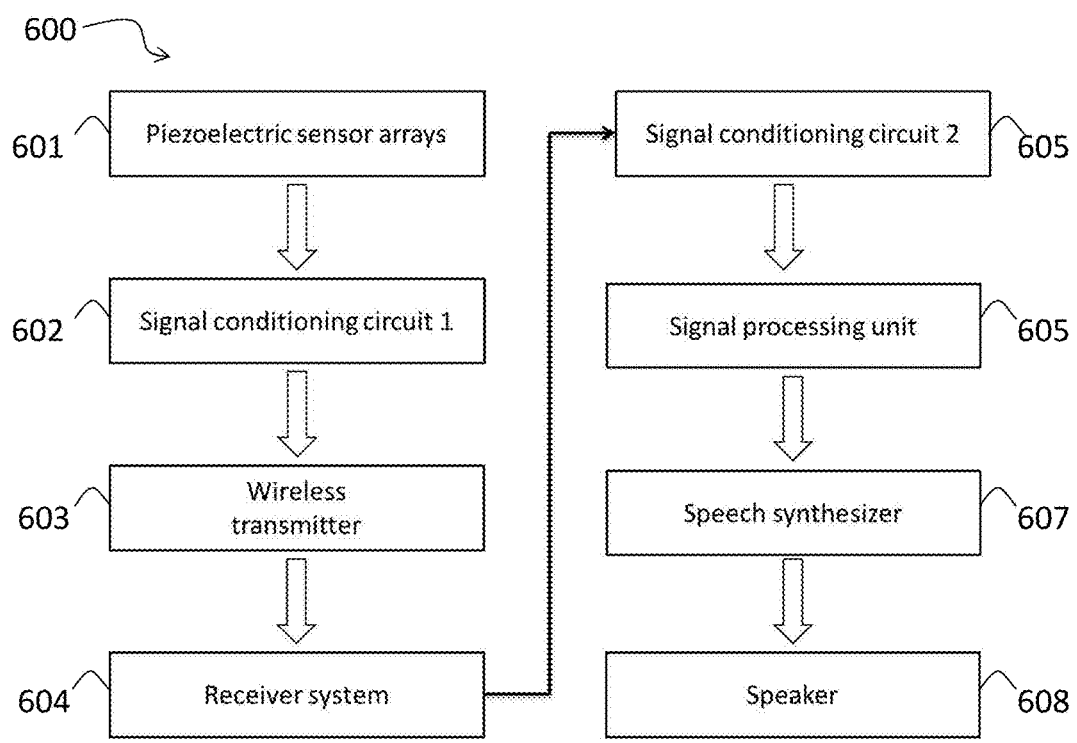
FIG. 6 shows a schematic block diagram representing a method according to an embodiment of the invention.

FIG. 5 shows a schematic diagram showing the relationship in the time domain between the chest pressure acting mechanical movement c(t), output piezoelectric electrical signal p(t), the sound audio electrical signal s(t) and the voice signal (natural one) v(t).

Signal processing algorithms are used to map and extract the corresponding set of speech signals. Based on FIG. 5, the speech signal could be described using the convolution process as follow:

$$p(t)=H1(t)*c(t) \qquad (3)$$

$$s(t)=H2(t)*v(t) \qquad (4)$$

$$c(t)=H3(t)*v(t) \qquad (5)$$

where H1(t), H2(t) and H3(t) are the time domain transfer functions (operators) for the chest tendons-piezoelectric, the audio-voice and the voice-chest tendons relationships, respectively. In addition, the technique provided above may also be used to extract signals specific to other physiological phenomena that may contribute to inducing mechanical stress on the piezoelectric material. Such technique was described in U.S. application Ser. No. 15/095,956 titled "Apparatus and Method for Physiological Mechanical and Electrical Activity Monitoring", the entire content of which is hereby incorporated by reference.

The physical measurements obtained using the speech synthesis system described in this invention correlate between two simultaneous measurements. The first is the electrical piezoelectric signal p(t), which is generated by the piezoelectric sensor by detecting the mechanical movement of the chest atop or near the sound tendons of the user when the user speaks the control sound. The second is the electrical audio signal s(t) measured during the same time the user speaks the controlled sound. To achieve the mathematical relationship between these two physical entities, the model described in equations (3)-(5) is considered in the frequency domain, with the application of the Fourier transform. This results in the following:

$$P(f)=H1(f)C(f) \qquad (6)$$

$$S(f)=H2(f)V(f) \qquad (7)$$

$$C(f)=H3(f)V(f) \qquad (8)$$

where equations (6)-(8) are the frequency representations of equation (3)-(5). Respectively. The frequency response of the system described is used to correlate directly the chest mechanical movement with the human voice. Equations (7) and (8) may be manipulated to achieve the following:

$$S(f) = \frac{H2(f)}{H3(f)}C(f) \qquad (9)$$

Equation (9) correlates and establishes the desired relationship between the chest mechanical movement and the audio electrical signal. Furthermore, from equation (6) the chest frequency domain could be extracted from the piezoelectric output voltage signal as follow:

$$C(f) = \frac{P(f)}{H1(f)} \qquad (10)$$

where H1(f) represent the frequency transfer function of the piezoelectric employed sheet in the speech synthesis system.

To directly recover or synthesize the corresponding audio signal, equation (10) is substitute in equation (9), which yields:

$$S(f) = \frac{H2(f)}{H3(f)H1(f)}P(f) \qquad (11)$$

The inverse Fourier transformation is used to construct the corresponding electrical audio signal at any time and directly from the measured output piezoelectric voltage, and the following relationship may be used to describe the electrical audio signal:

$$s'(t) = F^{-1}\left[\frac{H2(f)}{H3(f)H1(f)}P'(f)\right] \qquad (12)$$

Where $F^{-1}$ is the inverse Fourier transformation, s'(t) is the generated electric audio signal corresponding for a frame taken at time t, P'(f) is the corresponding frequency domain of the measured piezoelectric output voltage and $$\left[\frac{H2(f)}{H3(f)H1(f)}\right]$$

is the parameter identified for a letter, word or phrase during the mapping of the piezoelectric and electric audio signal during the control setup described above.

When the system is used by the user at a time different from the control setup time, the processor in the system is used to analyze the different frames of the measured piezoelectric signal that is generated based on the mechanical detection of the chest movement atop of or near the sound tendons when the user speaks. Each of the frames is considered and a comparison is conducted with the identifying parameters stored in the library, which is accessible by the processor using different comparison techniques known in the art. The processors then generates, based on the analysis, an audio signal representative of the mechanical movement of the chest during the action of speaking. The generated audio signal is then communicated to a loudspeaker for broadcasting and conveyance.

In one embodiment, during the comparison process, the processor may access a frame of the newly generated piezoelectric signal and compare it to identifying parameters stored in the library using auto-correlative correlation. If the result of the correlation is found to be high, the processor may then tag the identifying parameter as a positive result and move on to the next frame. In some embodiments, pre-determined values are set as threshold on which assessment values are compared and based on the comparison, an evaluation of a good or a bad correlation is provided by the processor. Such pre-determined values may vary from one subject to another and may be based on gender, age, weight and other philological and/or physical characteristics known in the art.

In some embodiments, the speech synthesis system may also include a wired or wireless transmitter and receivers (not shown) as well as additional conditional circuits. FIG. 5 shows a schematic block diagram representing a method 600 implemented in such embodiment. In method 600, step 601 describes an array of piezoelectric sensors generating an electrical signal based on the mechanical movement of the chest of the subject atop of or near the sound tendons when the user speaks. Step 602 describes passing the signal by a processor to a first conditional circuit for amplification. Step 602 may be skipped if the signal is determined to be above a pre-determined threshold, which is determined based, at least, on the type of the processor and transmitter, and the processor may transmit the signal directly without amplification according to step 603. Step 603 shows the use of a wireless transmitter to transmit the signal. However, it should be understood that in some embodiments, the transmitter may be a wired one. In case of wireless transmission, transmission may be done in accordance with any known wireless transmission techniques known in the art.

The pre-determined threshold value may also be dependent on additional parameters such as age, gender, weight and other physiological and/or physical parameters. Once transmitted, step 604 shows the signal being received by a receiver system, which can be wireless or wired, similar and corresponding to the configuration of the transmitter used in the system. The receiver may be in proximity to the subject or it may be away from the subject.

Once received, step 605 shows the signal being passed by a second conditioning circuit for amplification. Step 605 may also be skipped if the received signal is determined to be above a pre-determined threshold. The pre-determined threshold conditions may be the same as or different from the ones identified in step 602.

The signal is then processed by a signal processing unit at step 606. The receiver and the processor may be at the same location or a location different than the location of the transmitter. Therefore, the processing of the signal once received may be done in proximity of or way from the subject. In some embodiments (not shown), piezoelectric sensors may be attached to the subject and a transmitter may be either attached to the subject or may be carried by the subject. The transmitter may be located at a distance away from the sensor to reduce noise and/or interference. The signal processor is used to process the piezoelectric signal and extract certain set of parameters that may be used for identification and recognition. These identified parameters are then used to generate the speech signal through the speech synthesizer at step 607. At step 608, the synthesized speech is conveyed through speakers.

In application, method 600 allows for the possibility of synthesizing speech using a passive, compact body held, light weight, easy to use, human compatible and comfortable system. Also, another feature that that may be achieved by the system described in the current disclosure is the self-powered capability.

It is well known that cardiac activity is periodic and never ending in living humans. As described in U.S. patent application Ser. No. 15/095,956, titled "Apparatus and Method for Physiological Mechanical and Electrical Activity Monitoring", such activity as well as other physiological activities causes continuous periodic mechanical movement of the human chest.

Due to the transducing qualities of the piezoelectric material used in the system, some of the mechanical energy produced on the surface of the chest due to cardiac activity as well as other physiological activities may be harvested by piezoelectric elements and stored in a power storage unit such as a capacitor in electrical communication with the piezoelectric elements forming part of the speech synthesis system described. The energy harvesting piezoelectric elements may be the same or different elements to the ones used in the sensors for detecting mechanical movement of the top region of the chest during the act of speaking.

The stored power may be use to power and operate the system without the need for an external power source. However, in some embodiments, an external power source is provided.

In the description above, it is provided that the piezoelectric sensors are positioned in areas on the chest atop of or near the sound tendons which vibrate and produce mechanical movement on the chest when the user speaks. This is because the chest is understood to act as a bulky chest membrane that dampens the mechanical movement. Therefore, the closer the piezoelectric sensors are placed to the source of the mechanical movement, the stronger the mechanical movement detected and therefore, the stronger the electrical signal generated. It is contemplated that implantable sensors with wireless capabilities may be used in place of or in addition to the contact sensors described in this disclosure.

The system provided allows for speech synthesis using different languages based on the language used by the user and depending on the availability of libraries of identifying parameters that will allow speech synthesis in that language. This is because the speech synthesis system described in this disclosure allows for the programming, reprogramming and the training of the system. Also, the speech identifier parameters are produced by subjecting the user to a control setup in which different condition may be controlled.

In addition to assisting the speech impaired by synthesizing speech, this system may also find application among humans without speech problems in which a user may be able to wear a fully or partially concealed speech synthesis system that allows such user to communicate with a remotely located receiver. In such embodiments, the use of the wireless transmission and reception of the piezoelectric signal allows for long distance communication between the user and the remote location where the speech synthesizer and speaker are present. In other embodiments, while the synthesized speech may be conveyed in the proximity of the user due to the presence of the speakers near to or on the user, the synthesized speech may also be communicated via wireless transmission to other speakers for simultaneous or delayed multiple node conveyance.

Interpretation of Terms

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

"subject" refers to a human or other animal. It is intended that the term encompass patients, such as vocally-impaired patients, as well as inpatients or outpatients with which the present invention is used as a diagnostic or monitoring device. It is also intended that the present invention be used with healthy subjects (i.e., humans and other animals that are not vocally-impaired, nor suffering from disease). Further, it is not intended that the term be limited to any particular type or group of humans or other animals.

"frequency" (f) refers to the number of complete cycles of a periodic quantity occurring in a unit of time. The unit of frequency is the "hertz," corresponding to the frequency of a periodic phenomenon that has a period of one second.

"amplifier" refers to a device that produces an electrical output that is a function of the corresponding electrical input parameter, and increases the magnitude of the input by means of energy drawn from an external source (i.e., it introduces gain). "Amplification" refers to the reproduction of an electrical signal by an electronic device, usually at an increased intensity. "Amplification means" refers to the use of an amplifier to amplify a signal. It is intended that the amplification means also includes means to process and/or filter the signal.

"receiver" refers to the part of a system that converts transmitted waves into a desired form of output. The range of frequencies over which a receiver operates with a selected performance (i.e., a known level of sensitivity) is the "bandwidth" of the receiver. The "minimal discernible signal" is the smallest value of input power that results in output by the receiver.

"transmitter" refers to a device, circuit, or apparatus of a system that is used to transmit an electrical signal to the receiving part of the system. A "transmitter coil" is a device that receives an electrical signal and broadcasts it to a "receiver coil." It is intended that transmitter and receiver coils may be used in conjunction with centering magnets which function to maintain the placement of the coils in a particular position and/or location.

"speaker" and "loudspeaker" refer to electroacoustic devices that convert electrical energy into sound energy. The speaker is the final unit in any sound reproducer or acoustic circuit of any broadcast receiver. It is not intended that the present invention be limited to any particular type of speaker. For example, the term encompasses loudspeakers including but not limited to magnetic, cone, horn, crystal, magnetorestriction, magnetic-armature, electrostatic, labyrinth speakers. It is also intended that multiple speakers of the same or different configurations will be used in the present invention.

"microphone" refers to a device that converts sound energy into electrical energy. It is the converse of the loudspeaker, although in some devices, the speaker-microphone may be used for both purposes (i.e., a loudspeaker microphone). Various types of microphones are encompassed by this definition, including carbon, capacitor, crystal, moving-coil, and ribbon embodiments. Most zz microphones operate by converting sound waves into mechanical vibrations that then produce electrical energy.

"transducer" refers to any device that converts a non-electrical parameter (e.g.; sound, pressure or light), into electrical signals or vice versa. Microphones are one electroacoustic transducers.

"power source" and "power supply" refer to any source of electrical power in a form that is suitable for operating electronic circuits.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for synthesizing speech using piezoelectric material in contact with a chest of a subject, the method comprising:
    obtaining a piezoelectric electrical signal from the piezoelectric material, the piezoelectric electrical signal based on mechanical movement of the chest, the mechanical movement related to movement of sound tendons of the subject during an act of speaking;
    communicating the piezoelectric electrical signal to a signal processor;
    manipulating the piezoelectric electrical signal in the signal processor using signal processing techniques;
    extracting from the manipulated piezoelectric electrical signal a set of speech identifying parameters; and
    generating a speech signal using the set of speech identifying parameters, the speech signal corresponding to the piezoelectric electrical signal.

2. The method of claim 1, the method further comprising conveying the generated speech signal using a speaker.

3. The method according to claim 1, wherein manipulating the piezoelectric electrical signal comprises:

segmenting the piezoelectric signal into a plurality of frames and identifying from at least one of the plurality of frames at least one parameter of the set of speech identifying parameters.

4. The method according to claim 1, the method further comprising powering the signal processor using electricity generated from movement of the chest due to mechanical movement related to movement of the sound tendons and other physiological activity.

5. The method according to claim 1, the method further comprising:
obtaining an audio electrical signal corresponding to the movement of the sound tendons of the subject during the act of speaking;
mapping the audio electrical signal to the piezoelectric signal; and
storing the mapped piezoelectric signal in a library for comparison with the set of speech identifying parameter.

6. The method according to claim 5, wherein the mapping of the piezoelectric electric signal to the audio electrical signal is performed using a linear one-to-one mapping technique.

7. The method according to claim 5, the method further comprising storing the library on a memory storage device, wherein the memory storage device is accessible by the processor.

8. The method according to claim 5, the method further comprising:
selecting the mapped piezoelectric signal when a positive correlation is established between the mapped piezoelectric signal and at least one parameter of the set of speech identifying parameters, wherein the selected mapped piezoelectric signal forming part of the speech signal.

9. The method according to claim 1, the method further comprising filtering and amplifying the piezoelectric signal before processing.

10. The method according to claim 1, wherein the step of manipulating the piezoelectric signal using signal processing techniques comprises:
wirelessly transmitting the piezoelectric signal using a transmitter; and
receiving the transmitted piezoelectric signal using a receiver located at a location away from the transmitter, wherein the step of extracting from the manipulated piezoelectric signal the set of speech identifying parameter is performed at the location of the receiver.

11. The method according to claim 10, wherein the method further comprises comparing the piezoelectric signal to a pre-determined threshold before transmitting it by the transmitter and amplifying the piezoelectric signal before transmitting it if the piezoelectric signal is determined to be below the pre-determined threshold.

12. The method according to claim 11, wherein the method further comprises comparing the transmitted piezoelectric signal after receiving it by the receiver to a second pre-determined threshold and amplifying the transmitted piezoelectric signal after receiving it by the receiver if the transmitted piezoelectric signal is determined to be below the second pre-determined threshold.

13. A system for synthesizing human speech, the system comprising:
piezoelectric based sensors for placement in contact with a chest of a subject, the piezoelectric based sensors sensing mechanical movement of the chest, the mechanical movement related to movement of sound tendons of the subject during an act of speaking; the piezoelectric based sensors generating a piezoelectric signal corresponding to the mechanical movement of the chest; and
a processor for receiving the piezoelectric signal generated from the piezoelectric based sensors, the processor configured to manipulate the received piezoelectric signal generated, extract a set of speech identifying parameters and generate a speech signal using the set of speech identifying parameter, the speech signal corresponding to the piezoelectric signal.

14. The system according to claim 13, the system further comprising a power storage unit for storing transduced electricity from piezoelectric material, the transduced electricity transduced from mechanical movement on the chest of the subject due to movement of the sound tendons and other physiological activity, the power storage unit powering the processor.

15. The system according to claim 14, wherein the physiological activity comprises one or more of heart activity and lungs activity.

16. The system according to claim 13, the system further comprising at least one speaker for conveying the speech signal.

17. The system according to claim 16, wherein the at least one speaker comprises a first speaker proximate to the processor and a second speaker away from the processor and wherein the speech signal is conveyed by the first speaker and the second speaker simultaneously.

18. The system according to claim 13, the system further comprising at least one transmitter for wirelessly transmitting the piezoelectric signal to at least one receiver located at a location away from the at least one transmitter and wherein the processor is located at the same location as the at least one receiver.

19. The system according to claim 18, the system further comprising a first conditional circuit for filtering and amplifying the piezoelectric signal before transmitting it to the at least one receiver and a second conditional circuit for filtering and amplifying the received transmitted piezoelectric signal before conveying it to the processor.

20. One or more processors for synthesizing human speech, the one or more processors configured to:
receive piezoelectric signals generated based on mechanical movement of a chest portion of a subject, the mechanical movement related to movement of sound tendons of the subject during an act of speaking;
manipulate the received piezoelectric signal;
extract from the manipulated piezoelectric signal a set of speech identifying parameter; and
generate a speech signal using the set of speech identifying parameter, the speech signal corresponding to the piezoelectric signal.

* * * * *